United States Patent Office 2,885,152
Patented May 5, 1959

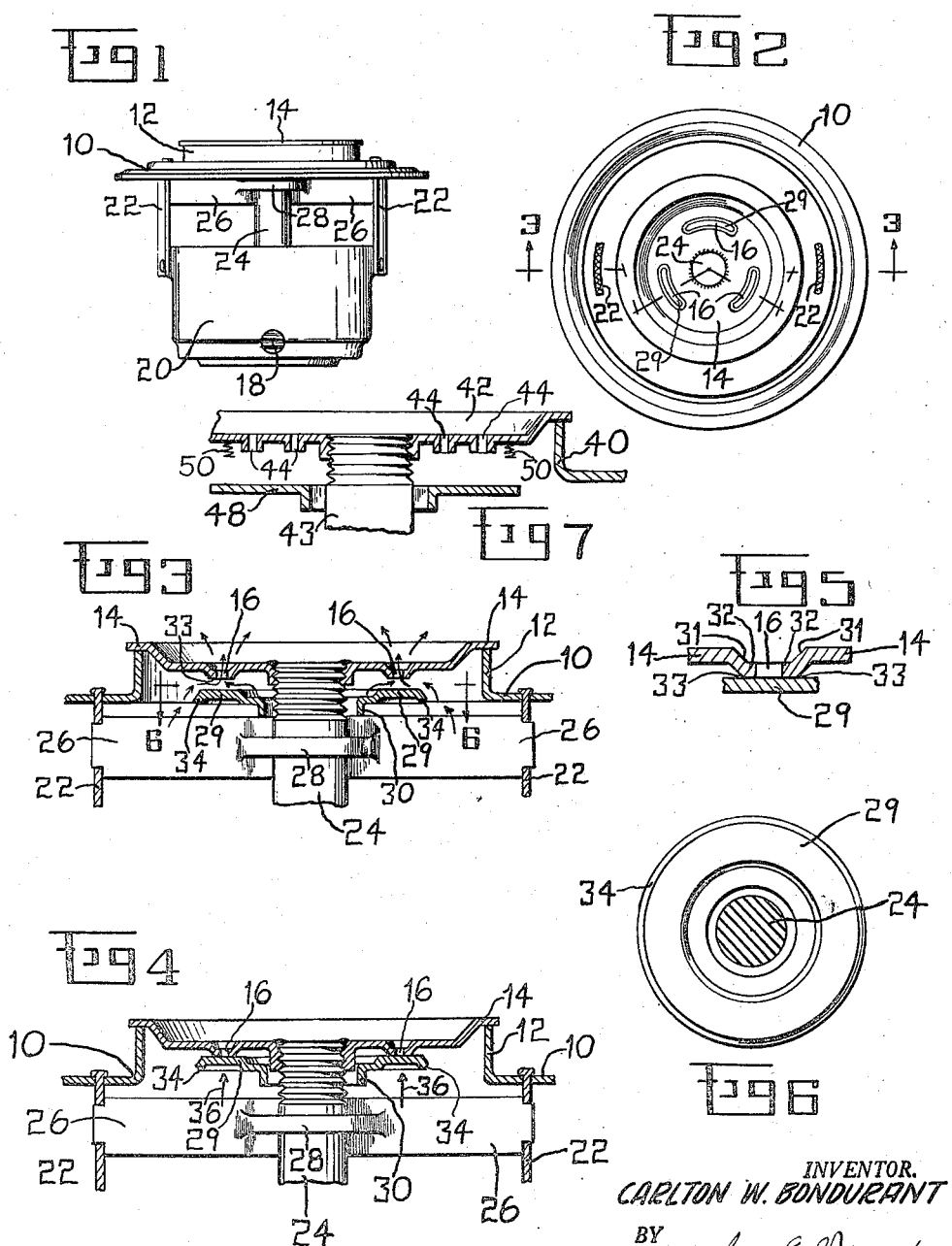

2,885,152

FLUID CONTROL VALVE

Carlton W. Bondurant, Dayton, Ohio, assignor to Standard-Thomson Corporation, Vandalia, Ohio, a corporation of Delaware Application January 27, 1955, Serial No. 484,395

7 Claims. (Cl. 236—34)

This invention relates to a fluid control valve. The invention relates more particularly to a fluid control valve for the cooling system of an internal combustion engine; however, the invention is not so limited in that it may be applied to other types of fluid systems.

A problem has long existed in the art of thermostatic fluid control valves for internal combustion engines. The fluid control valve of a cooling system for internal combustion engines is normally positioned in a fluid conduit intermediate a radiator and the engine. During the process of filling the cooling system with the coolant, the liquid coolant enters an inlet passage of the system, which inlet is usually disposed at the upper portion of the radiator. Then the coolant flows downwardly into the conduit within the engine.

Due to the fact that the thermostatic valve is closed under normal room temperatures, air is thus trapped within the conduit of the cooling system within the engine between the valve and the upper level of the coolant liquid. Various methods and devices have been used to permit this trapped air to escape. Some valves have been provided with a small orifice therein to permit a leakage of trapped air therethrough during the filling process. However, such an orifice must be small in order to prevent excessive leakage of coolant fluid during operation of the engine. Also, an orifice small enough to prevent excessive leakage of fluid has been found to be too small to permit sufficient outward flow of trapped air for rapid filling of the cooling system. Hence, it has been found that an orifice sufficiently large to permit an adequate rate of discharge of trapped air was too large to permit proper closure against circulation of coolant fluid. Naturally, it is highly desirable that no liquid whatsoever circulate in the system when the valve member is closed.

Attempts have been made to place a pin through the orifice, the pin having a flap attached at one end thereof which may close the orifice when sufficient pressure is exerted upon the flap. However, this has not been satisfactory and sufficient flow of trapped air during a filling process has not been possible.

It has also been found that if a movable flap or disc is used to cover an orifice through a valve, said disc or flap tends to adhere or cling to the valve after engagement therewith, even after pressure is released therefrom.

Hence, an object of this invention is to provide a fluid control valve which permits an adequate rate of discharge of trapped air therethrough when the valve is in the closed position during the filling process, and which valve also thoroughly seals against liquid leakage during operation of the engine.

Another object of this invention is to provide an auxiliary closure member for a fluid control valve, which auxiliary closure member permits air within a cooling system to escape during the process of filling the cooling system with a coolant liquid, and which auxiliary closure member automatically closes when a predetermined pressure is exerted thereupon.

Another object of the invention is to provide a closure means for relief passages of a valve, which closure means automatically opens when pressure thereupon drops below a given value.

Another object of the invention is to provide a valve seat arrangement for relief orifices of a valve, which valve seat permits thorough sealing by a closure member and which valve seat also prevents adhesion or clinging of the closure member to the valve.

Another object of the invention is to provide a fluid valve of this type which may be produced at low cost and is long-lived.

Other objects and advantages reside in the construction of parts, the combination thereof and the mode of operation, as will become more apparent from the following the description.

In the drawing,

Figure 1 is a side elevational view of a fluid control valve of this invention.

Figure 2 is a top elevational view of a fluid control valve of this invention.

Figure 3 is a sectional view taken substantially on line 3—3 of Figure 2; this figure shows the auxiliary closure member of the valve in its open position.

Figure 4 is a sectional view similar to that of Figure 3, showing the auxiliary closure member in its closed position.

Figure 5 is an enlarged fragmentary view, showing the auxiliary closure member in its closed position.

Figure 6 is a sectional view taken substantially on line 6—6 of Figure 3.

Figure 7 is a fragmentary cross sectional view of a preferred modification of the valve of the invention.

Referring to the drawing in detail, a valve of this invention comprises an annular body member 10 provided with an annular flange portion 12 which forms a valve seat having a fluid port therethrough. The annular valve seat formed by the flange 12 is adapted to be engaged by a main closure member 14 for closure of the fluid port.

The main closure member 14 is provided with a plurality of elongate apertures 16. All of the apertures 16 are shown by Figure 2 as being slightly arcuated and having a common center of curvature. It is to be understood, however, that the apertures 16 of the main closure member 14 may be of any suitable shape, size or number.

The main closure member 14 may be actuated by any suitable thermal responsive, pressure responsive or other type of control means. Herein shown, the actuator means is a bellows 18 disposed within a housing 20. The housing 20 is attached to the body member 10 by means of a plurality of connector legs 22. The bellows 18 or actuator means within the housing 20 is attached to the main closure member 14 by an actuator rod or valve stem 24 which is threadedly attached to the main closure member 14.

A guide bar 26 is attached to two of the connector legs 22 and disposed therebetween. The guide bar 26 is provided with a loop 28 which freely encompasses the actuator rod 24. The longitudinal movement of the actuator rod 24 is thus guided by means of the loop 28 of the guide bar 26.

Adjacent the main closure member 14 is an auxiliary closure member 29 provided with a collar 30 which loosely encircles the valve stem 24. The auxiliary closure member 29 is adapted to close the apertures 16 of the main closure member 14.

Each of the apertures 16 may be disposed within a depressed or protuberant portion 31 of the main closure member 14, as clearly shown in Figures 3, 4 and 5. Each depressed or protuberant portion 31 terminates in a lip portion 32 which is herein shown as substantially parallel to the upper surface of the main closure member 14. Thus, an excellent valve seating surface 33 for the auxiliary closure member 29 is formed by the lower side of the lip 32 encompasing each aperture 16, as clearly shown in Figure 5.

The seating surfaces 33 encompassing the apertures 16 are such that proper sealing action is provided between the seating surfaces 33 and the auxiliary closure member 29. Furthermore, the seating surfaces 33 are of such area that the auxiliary closure member 29 does not tend to cling or adhere to the seating surfaces.

The auxiliary closure member 29 may be provided with an annular peripheral flange 34 extending in a direction away from the main closure member 14, as shown in Figures 3 and 4. The collar 30 of the auxiliary closure member 29 is adapted to rest upon the guide bar 26, as shown in Figure 3, when the auxiliary closure member 29 is not urged by fluid pressure against the main closure member 14.

When the fluid control valve of this invention is positioned within a cooling system of an internal combustion engine, the normal position of the valve is as shown with the flange 12 and the closure member 14 at the uppermost portion thereof. Thus, the auxiliary closure member 29 is normally resting upon the guide bar 26, as shown in Figure 3. As coolant liquid flows into the cooling system to fill the conduits thereof, air which is in the cooling system above the surface of the coolant and below the main closure member 14 is permitted to rapidly escape by passing adjacent the auxiliary closure member 29. Air may flow intermediate the loosely fitting collar 30 and the valve stem 24. Air may also flow between the flange 12 of the body 10 and the flange 34 of the auxiliary closure member 29. The air then flows outwardly through the plurality of apertures 16, as shown in Figure 3. Thus, the cooling system may be filled very rapidly with coolant fluid.

Most internal combustion engines are provided with a pump for circulating the coolant fluid within the cooling system. Thus, when operation of the engine is begun, the pump of the cooling system causes pressure of the coolant fluid against the lower surface of the auxiliary closure member 29, as illustrated by arrows 36 in Figure 4. This pressure of the coolant liquid forces the auxiliary closure member 29 into engagement with the seating surfaces 33 of the depressions 31, closing the apertures 16, as shown in Figures 4 and 5. Thus, both the auxiliary closure member 29 and the main closure member 14 are in closed position until an actuator means, such as the bellows 18, within the housing 20 causes the valve stem 24 to move the main closure member 14 into an open position.

When the main closure member 14 is in open position, the liquid pressure of the coolant fluid may be sufficient to retain the auxiliary closure member 29 in engagement with the main closure member 14 or the pressure of the liquid coolant may be insufficient to retain this engagement. Whether the auxiliary closure member 29 maintains engagement with the main closure member 14 during open position of the main closure member 14 is unimportant due to the fact that if the main closure member should be brought to a closed position at any time during operation of the engine, the pressure of the coolant fluid within the cooling system will force the auxiliary closure member 29 into engagement with the main closure member 14, closing the apertures 16, as shown in Figures 4 and 5.

In Figure 7 is shown a preferred modification of the valve of this invention. A body member 40 has a port therethrough closeable by means of a main closure member 42 attached to an actuator rod 43. The main closure member 42 is provided with a plurality of orifices 44 therethrough. The orifices 44 are closeable by means of an auxiliary closure member 48 slidably encompassing the actuator rod 43.

A plurality of springs 50 are shown attached to the lower surface of the main closure member 42. These springs 50 may be provided for urging the auxiliary closure member 48 from the main closure member. This prevents clinging of the auxiliary closure member to the main closure member after fluid pressure upon the auxiliary closure member has decreased. Resilient means such as springs 50 may also be used if the valve is to be angularly inclined from the vertical.

It is to be understood that a valve seating surface for an auxiliary closure member may be any flat surface encompassing each aperture or orifice of the main closure member.

From the foregoing description, it is understood that the fluid control valve of this invention provides means by which a closed valve member may permit escape of trapped air within the cooling system. The valve of this invention also is provided with means by which the valve member is automatically tightly sealed when subjected to certain pressure conditions. Operation of the auxiliary closure member is automatic and dependable. The valve herein disclosed may be directly responsive to temperature changes while permitting fluid flow therethrough below a given value of fluid pressure. When fluid pressure increases above this value, fluid flow through the valve is prevented.

The fluid control valve of this invention may thus be used for other purposes than that related to cooling systems of internal combustion engines. A valve made according to this invention may be employed in any application in which it is desirable to have a fluid valve controlled by any suitable means, which valve also includes means for permitting fluid flow below a given value of fluid pressure.

Although the preferred embodiment of the device has been described, it will be understood that within the purview of this invention various changes may be made in the form, details, proportions and arrangement of parts, the combination thereof and mode of operation, which generally stated consist in a device capable of carrying out the objects set forth, as disclosed and defined in the appended claims.

Having thus described my invention, I claim:

1. In a fluid control valve comprising a body member having an inlet end and an outlet end and provided with a centrally located annular flange forming a fluid port therethrough, the peripheral edge of the flange defining a valve seat, a main closure member engageable with the valve seat for closing the fluid port, an actuator rod attached to said main closure member extending therefrom, a control member attached to said actuator rod in spaced relation from said main closure member, a plurality of connector legs joining the control member to the body member, the main closure member being provided with a plurality of protuberances, each of the protuberances having an aperture therethrough, and an auxiliary closure member loosely attached to said actuator rod and disposed between said inlet end and the main closure member, the auxiliary closure member being directly engageable with the protuberances of the main closure member for closing the apertures thereof resilient means engaging the auxiliary closure member and urging the auxiliary closure member in a direction away from the main closure member, engagement of the auxiliary closure member with the main closure member being caused by force of fluid entering the inlet end.

2. In a fluid control valve comprising a body member having an inlet and an outlet end and provided with a centrally located annular flange forming a fluid port therethrough, the peripheral edge of the flange forming a valve seat, a main closure member engageable with the valve seat for closing the fluid port, a plurality of connector legs extending from the body member in a direction therefrom opposite the flange thereof, a control member attached to said connector legs and disposed in spaced relation from the body member, an actuator rod for moving the main closure member to and from the valve seat, the actuator rod having one end thereof attached to the control member and the other end thereof attached to the main closure member, the actuator rod extending through the flange and through the fluid port, the main closure member being provided with a plurality of protuberances, each of the protuberances having an aperture therein, and an auxiliary closure member loosely attached to the actuator rod and disposed between said inlet end and the main closure member, the auxiliary closure member being directly engageable with the protuberances of the main closure member to close the apertures thereof, resilient means engaging the auxiliary closure member and urging the auxiliary closure member in a direction away from the main closure member, engagement of the auxiliary closure member with the main closure member being caused by force of fluid entering the inlet end.

3. A fluid control valve adapted to be positioned in a conduit of a cooling system, comprising an annular body portion provided with a passage therethrough and having an outer end defining the outlet end of said passage, the other end of the passage being the inlet end thereof, a main closure member engageable with said outer end for closing said passage, actuator means attached to said main closure member for moving said main closure member to and from engagement with said outer end of the body member for opening and closing said passage, said main closure member being provided with a plurality of protuberances, each of the protuberances having an aperture therethrough for permitting air to escape from the cooling system during filling of the cooling system with liquid, each of the protuberances forming a valve seat, an auxiliary closure member loosely and freely attached to the actuator means, the auxiliary closure member being disposed between said inlet end of the passage and the main closure member, the auxiliary closure member being engageable with the protuberances for closing said apertures, and resilient means engaging the auxiliary closure member and urging the auxiliary closure member in a direction from the main closure member, the auxiliary closure member being forced into engagement with the valve seat by liquid within the cooling system flowing from the inlet end of the passage toward the outlet end thereof.

4. In a fluid valve having an inlet portion and an outlet portion, a substantially flat main closure member, the main closure member being provided with a plurality of protuberances extending from one surface thereof, each of said protuberances having an orifice therethrough, a valve stem attached to the main closure member, thermal responsive means attached to the valve stem for movement of the main closure member, an auxiliary closure member loosely encircling the valve stem adjacent the main closure member and disposed intermediate the inlet portion and the main closure member, and resilient means engaging the auxiliary closure member urging the auxiliary closure member in a direction from the main closure member, the auxiliary closure member being movable by pressure of incoming fluid into engagement with said protuberances of the main closure member for closing the orifices thereof.

5. In a fluid control valve comprising a main valve seat member forming a fluid port therethrough, a main closure member engageable with the valve seat member for closing the fluid port, the main closure member having a plurality of protuberances, there being a plurality of apertures through the main closure member, there being one aperture through each protuberance, actuator means for moving the main closure member with respect to the main valve seat member, a substantially flat auxiliary closure member loosely attached to the actuator means and directly engageable with the main closure member to close the apertures of the main closure member.

6. In a fluid control valve comprising a body member provided with a centrally located annular flange forming a fluid port therethrough, the peripheral edge of the flange forming a valve seat, a main closure member engageable with the valve seat for closing the fluid port, a plurality of connector legs extending from the body member in a direction therefrom opposite the flange thereof, a control member attached to said connector legs and disposed in spaced relation from the body member, an actuator rod for moving the main closure member to and from the valve seat, the actuator rod having one end thereof attached to the control member and the other end thereof attached to the main closure member, the actuator rod extending through the flange and through the fluid port, the main closure member being provided with a plurality of projections, each of the projections having an aperture therein, each of the projections extending in a direction toward the control member and having a lip surface surrounding the aperture therein, the lip surface being substantially normal to the actuator rod, a disc member loosely encircling the rod member and disposed intermediate the main closure member and the control member, the disc member having a peripheral flange extending toward the control member, the disc member being engageable with all of the projections to close the apertures of the projections.

7. In a fluid control valve comprising a body portion provided with a centrally located flange extending therefrom and forming a fluid port therethrough, a main closure member engageable with the flange for closing the fluid port, a plurality of support arms extending from the body member in the direction opposite the flange thereof, control means attached to the support arms in spaced relation from the body member, a connector rod attached to the control means and to the main closure member for moving the main closure member to and from engagement with the flange member for opening and closing the fluid port, a guide member attached to the support arm intermediate the main closure member and the control means for guiding the movement of the connector rod, the main closure member having a plurality of protuberant portions therein, each of the protuberant portions extending toward the control means and having an aperture therein, and a circular disc member encircling the connector rod intermediate the main closure member and the guide member, the disc member having a collar at the central portion thereof loosely encircling the connector rod, the surface of the disc member being engageable with the protuberant portions to close the apertures therein.

References Cited in the file of this patent

UNITED STATES PATENTS

| | | |
|---|---|---|
| 80,474 | Good | July 28, 1868 |
| 388,766 | D'Lanoy | Aug. 28, 1888 |
| 526,177 | Blair | Sept. 18, 1894 |
| 637,994 | Klay | Nov. 28, 1899 |
| 1,342,985 | Cash | June 8, 1920 |
| 1,470,625 | Jones | Oct. 16, 1923 |
| 1,475,826 | Hoffman | Nov. 27, 1923 |
| 2,074,631 | White | Mar. 23, 1937 |
| 2,137,136 | Giesler | Nov. 15, 1938 |
| 2,174,042 | Rose | Sept. 26, 1939 |
| 2,221,752 | Bennett | Nov. 19, 1940 |
| 2,284,354 | Acly | May 26, 1942 |

FOREIGN PATENTS

| | | |
|---|---|---|
| 562,624 | Great Britain | July 10, 1944 |